United States Patent [19]

Janisse

[11] Patent Number: 5,002,462
[45] Date of Patent: Mar. 26, 1991

[54] HINGED AND QUICK MOUNT GUARD FOR AN ELECTRIC FAN

[75] Inventor: Dwight C. Janisse, St. Clair Beach, Canada

[73] Assignee: Dwight C. Janisse & Associates, Inc., Troy, Mich.

[21] Appl. No.: 430,130

[22] Filed: Nov. 1, 1989

[51] Int. Cl.$^5$ .................. F03D 3/00; F03D 11/00
[52] U.S. Cl. .................. 416/247 R; 417/423.14; 403/338
[58] Field of Search .................. 416/247 R, 247 A; 415/121.2, 126; 403/335, 338, 23; 417/423.1, 423.14

[56] References Cited

U.S. PATENT DOCUMENTS

| | | | |
|---|---|---|---|
| 2,215,035 | 9/1940 | Gundelfinger | 416/247 |
| 2,653,757 | 9/1953 | Segalman | 416/247 R |
| 3,262,638 | 7/1966 | Militello | 416/247 |
| 3,787,142 | 1/1974 | Dupke | 416/247 R |
| 3,791,333 | 2/1974 | Losch | 416/247 R |
| 3,963,382 | 6/1976 | Patton | 415/121.2 |
| 4,517,481 | 5/1985 | Breining | 310/71 |
| 4,657,478 | 4/1987 | LaZebnik et al. | 415/126 |
| 4,672,234 | 6/1987 | Breining et al. | 307/147 |
| 4,732,539 | 3/1988 | Shin-Chin | 415/126 |
| 4,861,230 | 8/1989 | Breining | 416/247 R |

FOREIGN PATENT DOCUMENTS 0145399  8/1984  Japan .................. 415/126

OTHER PUBLICATIONS

Fan Catalogue of Airmaster Fan Co. of Jackson, Mich., Effective Oct. 30th, 1981.

*Primary Examiner*—John T. Kwon
*Assistant Examiner*—Hoang Nguyen
*Attorney, Agent, or Firm*—Robert G. Mentag

[57] ABSTRACT

A hinged and quick mount guard for an electric fan. The fan guard includes a concave, dish-shaped rear guard member having an axial opening for the reception of a fan motor shaft, and a plurality of key holes for the reception of thru-bolts on the fan motor for securing the rear guard member to the fan motor. The fan guard includes a concave, dish-shaped front guard member hingedly and releasably retained on the rear guard member.

5 Claims, 3 Drawing Sheets

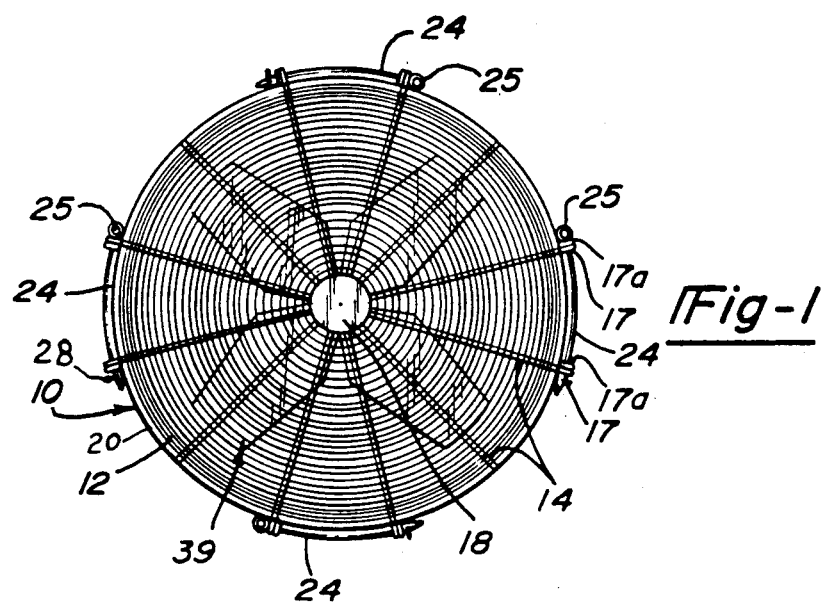
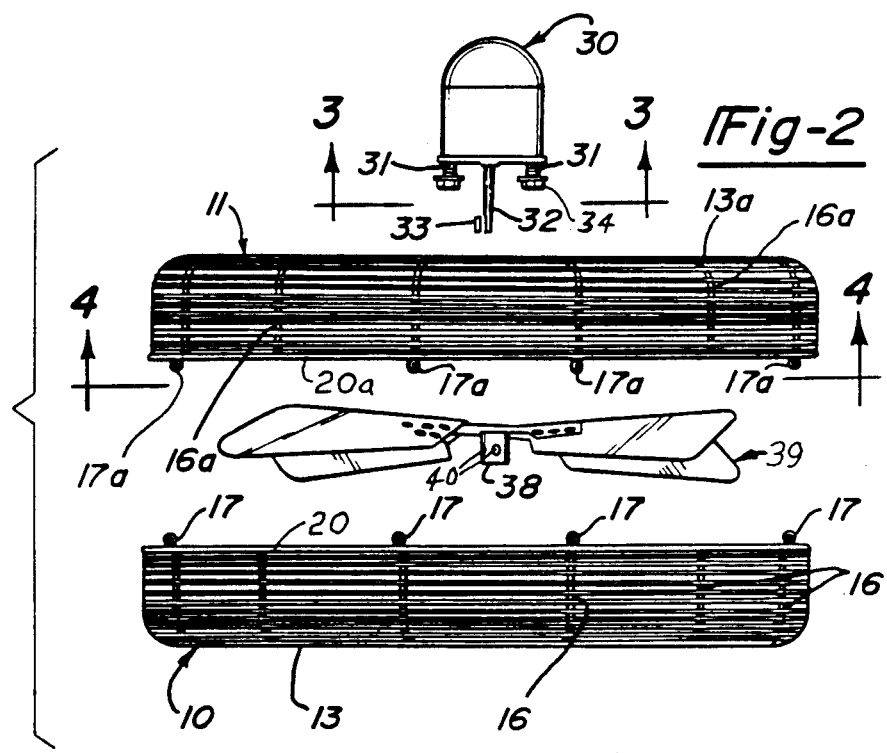
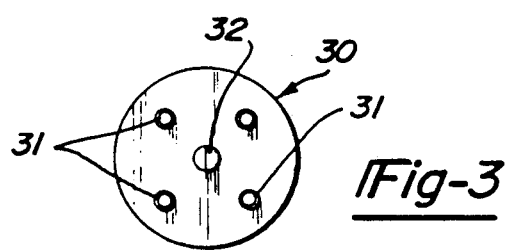

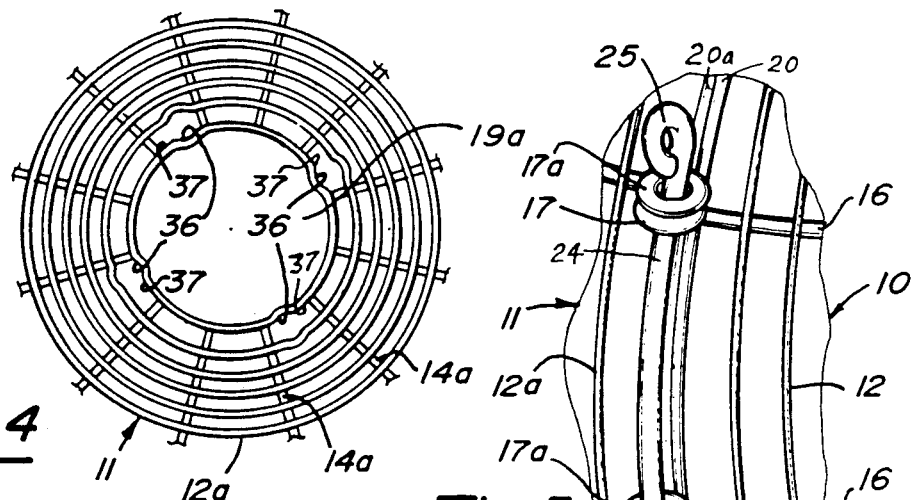
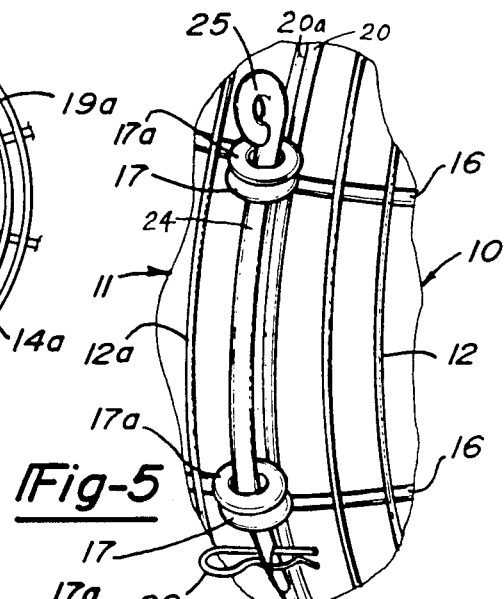
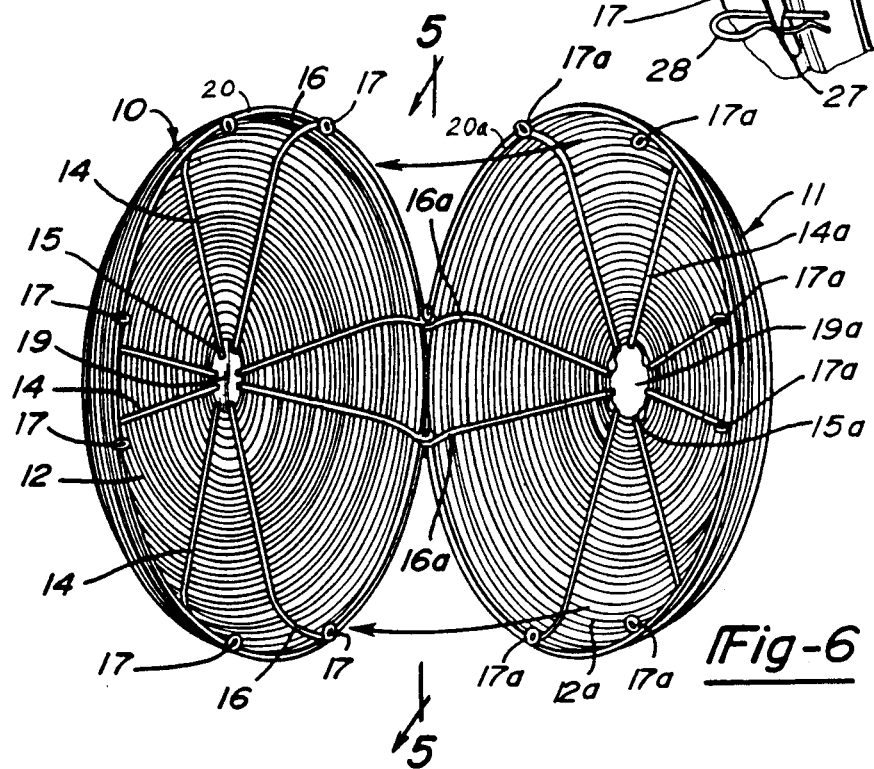
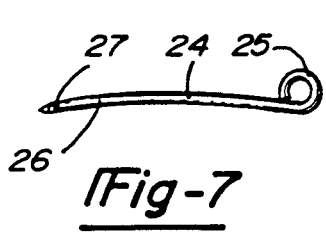

HINGED AND QUICK MOUNT GUARD FOR AN ELECTRIC FAN

BACKGROUND OF THE INVENTION

1. Technical Field

The field of art to which this invention pertains may be generally located in the class of devices relating to fan guards. Class 416, Fluid Reaction Surfaces, Sub-Class 247R, U.S. Pat. Office Classifications, appears to be the applicable general area of art to which the subject matter similar to this invention has been classified in the past.

2. Background Information

Air circulation fans are widely used in industrial environments, such as automobile plants, and other type factories. It is time consuming and expensive to assemble such industrial fans in industrial plants, and especially where such fans may be located many feet above the floor level. Industrial fans must be cleaned at least once a year because the edges of the fan blades get loaded with dirt, and if the blades are not cleaned periodically the fan motor will overheat. Such cleaning operations involve a disassembly of the fan guard to permit the maintenance workers to clean the fan blades, and such an operation is time consuming. Furthermore, when an industrial fan motor becomes inoperative or is damaged in some manner whereby the motor or the fan must be replaced, the disassembly of the fan guard from the motor is time consuming and comprises a costly operation. Heretofore, the fan guards for many industrial fans have comprised a front guard member and a back or rear guard member, with said guard members being held together by hooks. Experience has shown that when the prior art hooks are used for holding a fan front guard member on a fan rear guard member, the fan front guard member can be accidentally knocked off of the fan rear guard member, as for example, if the fan front guard member is hit by a fork lift carrying articles through a plant.

Heretofore, in order to overcome the accidental disassembly of a fan front guard from a fan rear guard it has been proposed to use tie wraps to tie the two fan guards together in addition to the hooks. However, a disadvantage in using tie wraps in conjunction with hooks is that the use of tie wraps adds additional disassembly time, and assembly time, when it is necessary to provide maintenance work on a fan, and they are not strong enough to provide positive security. Another disadvantage of the aforementioned type industrial fan guards is that they require more then one maintenance worker to assemble and disassemble the fan rear guard on a motor, as well as assembling and disassembling the fan front guard to the fan rear guard and secure them together. The use of the prior art hooks to secure a fan front guard to a fan rear guard requires at least two men, with one man holding the fan guards together while another maintenance worker employs a tool, such as a screw driver, to mount the hooks in place on the guard members to secure them together.

SUMMARY OF THE INVENTION

It is an object of the present invention to provide a guard for an industrial type fan which may be quickly and easily mounted in place on a fan motor in a shorter time period, and provide a safer and more secure assembly, than heretofore possible when employing prior art fan guards. The fan guard of the present invention includes a fan front guard member and a fan rear guard member, and a novel retainer means, for releasably securing the fan front guard member to the fan rear guard member. The retainer means provides an additional function as a hinge means, whereby the fan front guard member may be quickly and easily swung from a closed position to an open position, to allow a maintenance worker to clean a fan blade in a quick, efficent, safe, and time saving manner.

The retainer means for releasably securing the fan front guard member to the fan rear guard member is constructed and arranged so that it cannot be accidentally disconnected if the fan guard is hit by some object, such as a fork lift. An advantage of the fan guard of the present invention is that it can be quickly, safely, and easily mounted in an operative position on a fan motor by one maintenance worker, and it permits maintenance operations on an industrial fan by one maintenance worker. The retainer means includes a plurality of curved rods which are releasably mounted through adjacent eyelets on the fan front and rear guard members, and when all of the curved rods except one are removed, the fan front guard member can be swung from a closed position against the fan rear guard member on said one curved rod to an open position to allow maintenance operations on the fan covered by the fan guard.

The fan rear guard member is provided with a key hole means for quick mounting of the fan rear guard member onto the motor thru-bolts on the fan motor, and removal.

BRIEF DESCRIPTION OF THE DRAWINGS

FIG. 1 is a front elevation view of an industrial fan guard made in accordance with the principles of the present invention.

FIG. 2 is an exploded top view of the fan guard shown in FIG. 1, and showing the relationship of the fan front and rear guard members to a fan motor and a fan blade.

FIG. 3 is a front elevation view of the fan motor shown in FIG. 2, taken along the line 3—3 thereof, and looking in the direction of the arrows.

FIG. 4 is a partial, front elevation view of the fan rear guard member illustrated in FIG. 2, taken along the line 4—4 thereof, and looking in the direction of the arrows.

FIG. 5 is a fragmentary, enlarged, perspective view of a part of the retainer means for securing the fan front guard member to the fan rear guard member, taken along the line 5—5 in FIG. 6, looking in the direction of the arrows, and showing one of the retainer means functioning as a hinge means.

FIG. 6 is an elevation perspective view showing the fan front guard member swung to an open position, relative to the fan rear guard member, and employing the hinge means shown in FIG. 5 to permit the fan front guard member to be swung to such an open position.

FIG. 7 is an elevation view of a curved retainer rod employed in the hinge means shown in FIG. 5.

FIG. 8 is an elevation view of a locking pin employed in the hinge means illustrated in FIG. 5.

DESCRIPTION OF THE PREFERRED EMBODIMENTS

Figure 9:
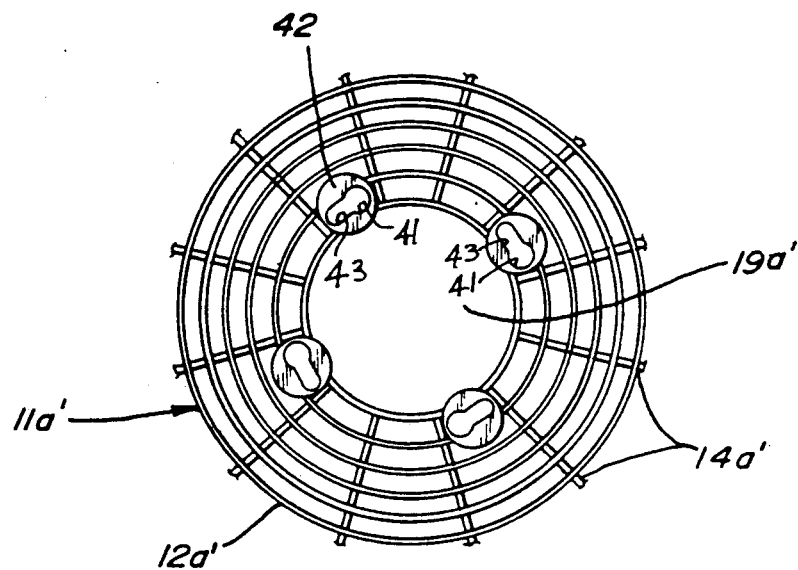
FIG. 9 is a fragmentary, front elevation view, similar to FIG. 4, of a second embodiment of a fan rear guard member, made in accordance with the principles of the present invention, and showing a modified means for retaining the fan rear guard member on the fan motor thru-bolts.

Referring now to the drawings, and in particular to FIGS. 1, 2 and 6, the fan guard of the present invention includes a fan front guard member, generally indicated by the numeral 10, and a fan rear guard member, generally indicated by the numeral 11. The body of the fan front guard member 10 comprises a plurality of concentric circular wire members indicated by the numeral 12. The circular wire members 12 may be made from any suitable material as for example, SAE 1010 metal wire of a suitable gauge, as for example No. 11½ gauge wire.

As best seen in FIG. 2, the fan front guard member 10 has a substantially vertical front face 13. As shown in FIGS. 1 and 4, the fan front guard member 10 includes twelve radial ribs 14 which may be made from any suitable gauge metal wire, as for example, No. 6 gauge wire. Each of the ribs 14 extend radially outward from an inner end 15 and terminates in an integral arcuate peripheral end 16. The radial ribs 14 and the arcuate peripheral ends 16 are secured to the circular wire members 12 by welding. The outer end circular, periphery wire 20 is made from a larger gauge wire then the circular wires 12, as for example, a No. 6 gauge wire. As shown in FIG. 6, eight of the arcuate peripheral ribs 16 have integrally formed on the outer ends thereof, an eyelet or metal ring 17. In FIG. 6, four of the radial ribs 14 have been deleted for purposes of clarity. The inner circular wire 12 forms a central opening in the fan front guard front surface, indicated by the numeral 19, and this opening is enclosed by a suitable plate 18. such as a name plate, which is welded in place to the front outer surface of the circular wires 12. It will be understood, that instead of making the fan front guard member 10 entirely from circular wires 12, the wires between at least the inner three circular wires 12 and the outer end circular periphery wire 20 may comprise a spiral wire construction.

As shown in FIGS. 2 and 6, the fan rear guard member 11 may be constructed substantially identical to the fan front guard member 10, and the corresponding parts thereof have been marked with the same reference numerals as used in the previous description of the structure of the fan front guard member, followed by the small letter "a". The fan rear guard member 11 is provided with means for quickly and easily mounting the fan rear guard member 11 on the motor 30 (FIG. 2), as described hereinafter.

FIG. 1 shows the fan front guard member 10 releasably secured to the fan rear guard member 11 by means of four curved rods 24, which also may be called a hinge rod or hinge means. In securing the two guard members 10 and 11 together, the fan front guard member 10 is moved into abutting engagement with the fan rear guard member 11 so that each eyelet 17 on the fan front guard member 10 is disposed adjacent and in alignment with a mating eyelet 17a on the fan rear guard member 11. A curved rod 24 is then slipped through each pair of adjacent aligned eyelets 17 and 17a. As best seen in FIG. 7, each of the curved rods 24 has a rounded end 25 which functions as a handle and which permits the user to hold the curved rods 24 and slip them into the releasable retaining positions shown in FIGS. 1 and 5. The end 26 of the curved rod 24, opposite to the rounded end 25, is preferably flattened and provided with a hole 27 for the reception of a suitable locking pin, shown in FIG. 8, and indicated by the numeral 28.

FIGS. 2 and 3 illustrate a conventional, industrial fan motor, generally indicated by the numeral 30. The motor 30 is provided with four mounting thru-bolts 31. As illustrated in FIG. 2, each of the motor thru-bolts 31 is provided with a self locking nut 34. The numeral 32 designates the motor shaft on which is operatively mounted a fan blade 39 by means of a fan mounting hub 38. A suitable motor shaft key 33 is provided for locking the fan hub 38 on the motor shaft 32.

FIG. 4 is a fragmentary view, taken from the inside of the fan rear guard member 11, and showing the key hole means for a quick and easy mounting of the fan rear guard member 11 onto the motor thru-bolts 31 with self locking nuts 34 pre-installed. As shown in FIG. 4, the two inner rings 12a are provided with four circumferentially, 90 degree evenly spaced apart key holes, formed by circular bends or enlargements 36 and an elongated space 37 between said two inner circular wires 12a. The mating circular bends 36 in the two inner circular wires 12a are opposite to each other so as to form a circular area to a size large enough for the reception or passage therethrough of the thru-bolts 31 and self locking nuts 34. The elongated spaces 37 are made wide enough to slidably receive the motor thru-bolts 31.

The fan guard of the present invention may be quickly and easily mounted on the fan motor 30 by a single maintenance worker in the following manner. The self locking nuts 34 are pre-installed on the outer ends of the motor thru-bolts 31, and the fan rear guard 11 is then picked up and moved toward the motor 30 so as to align the circular holes made by the arcuate forms 36 in the circular wires 12a. The circular holes are made large enough to pass over the self locking nuts 34 and to permit the fan rear guard member 11 to be positioned directly against the front end of the motor 30. The fan rear guard member 11 is then rotated clockwise to move the thru-bolts 31 into the straight elongated spaces 37 between the two inner circular wires 12a and against the adjacent radial rib 14a. The nuts 34 are serrated self locking nuts and they are then tightened to securely hold the fan rear guard member 11 onthe motor 30.

The fan blade and hub assembly, 39,38, is then slidably mounted on the motor shaft 32. The shaft 32 is secured in place in the hub 38 by the key 33 and a pair of set screws 40. The fan front guard member 10 is then releasably secured to the fan rear guard member 11 by holding the same up against the front end of the fan rear guard member 11 and inserting four of the curved rods 24 through two adjacent pairs of the eyelets 17 and 17a. A locking pin 28 is inserted into the pre-drilled holes 27 in the end 26 of each of the curved rods 24. The fan front guard 10 is thus very securely fastened to the fan rear guard 11 and cannot be accidentally dislodged from the fan rear guard 11. By removing any three of the locking pins 28 and the curve rods 24, the remaining rod 24 functions as a hinge for ease of cleaning the fan blade 39 or replacing the fan blade 39. It will be understood that the aforementioned key hole means 36 and 37 are disposed in a circular position so that when the fan rear guard member 11 is rotated to the position to be locked in place by the self locking nuts 34, at least one of the curved rods 24 will be in a vertical position as shown in FIGS. 1 and 6, so that the pair of fan guard members 10 and 11 can be swung to a 90 degree open position on the hinge means formed by one of the curved rods 24, for servicing the fan.

FIG. 9 is a fragmentary, inside view of a second embodiment of a fan rear guard member 11a' provided with a modified key hole means for securing the fan rear guard member 11a' onto the motor thru-bolts 31 on the fan motor 30. The parts of the fan rear guard member 11a' have been marked with the same reference numerals as employed heretofore in the first embodiment of FIGS. 1 thru 8, followed by the small letter "a'". In the embodiment of FIG. 9, a plurality of round metal key hole plates 42 are welded to two inner circular rings 12a' of the fan rear guard member 11a'. Each of the round metal plates has formed therethrough a key hole comprising a circular portion 41 and an elongated portion 43. The round metal keyhole plates 42 are disposed in circumferentially, 90 degree spaced apart positions so as to provide this embodiment with the same final positions of the curved retainer rods 24 when the fan rear guard member 11a' is fixedly secured to the motor 30 in the previously described manner for assembling the fan guard on the motor 30.

Figure 10:
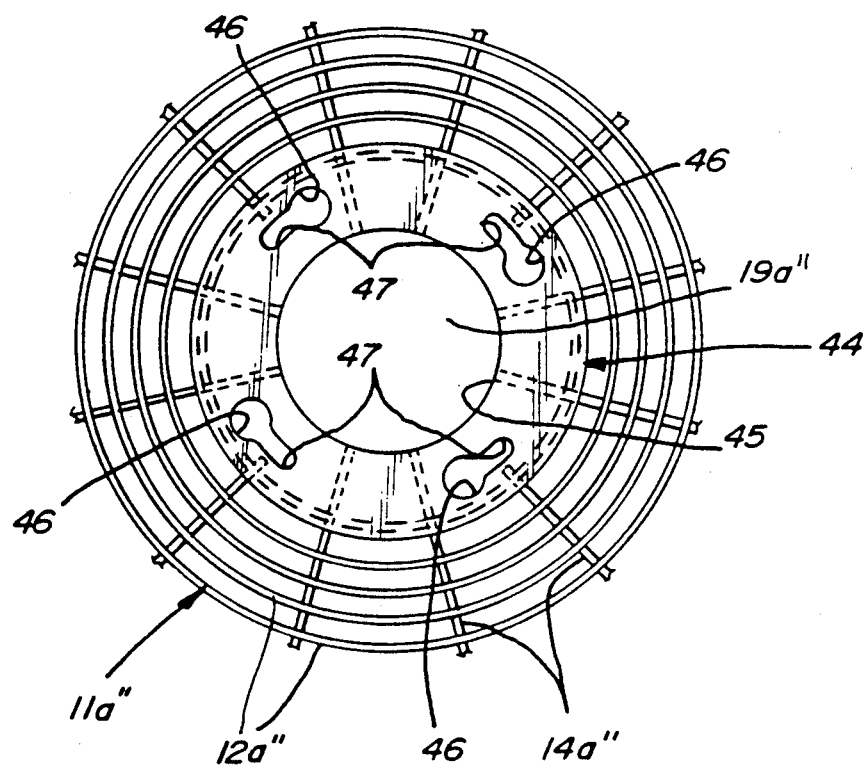
FIG. 10 is a fragmentary, front elevation view, similar to FIG. 4, of a third embodiment of a fan rear guard member, made in accordance with the principles of the present invention, and showing another modified means for retaining the fan rear guard member on the fan motor thru-bolts.

FIG. 10 is a fragmentary, inside view of a third embodiment of a fan rear guard member 11a" provided with a modified key hole means. The parts of the third embodiment shown in FIG. 10 which are the same as the parts of the first embodiment of FIGS. 1 thru 8 have been marked with the same reference numerals followed by the small letter "a''". In the third embodiment shown in FIG. 10, the key holes for use in attaching the fan rear guard member 11a" to the motor 30 are formed in a flat mounting ring 44 which is welded to the inside surface of the circular wires 12a". The numeral 45 designates an axial hole formed through the mounting ring 44. The key holes are formed 90 degrees apart circumferentially, by a plurality of circular holes 46 which each communicates with an elongated slot 47. The third embodiment fan rear guard member 11a" would be mounted on the fan motor 30 in the same manner as described hereinbefore for the first embodiment of FIGS. 1 thru 8. It will be understood that the flat mounting ring 44 may be mounted on the outer side of the fan rear guard 11a", if desired, instead of on the inner side, as shown in FIG. 10.

It will be understood that all parts of the fan front and rear guard members 10 and 11 are suitably galvanized, PVC (Polyvinylchoride) or properly treated and painted. A fan guard made in accordance with the teachings of the present invention may be made to any size diameter as for example, 24, 30 and 36 inches. An advantage of the structure of the fan front and rear guard members 10 and 11, respectively, is that they can be stacked for storage purposes without being inadvertently entangled with each other, as is common in the prior art fan guards wherein hooks are used to attach these two guard members together and the hooks get entangled with adjacent guard members when the guard members are stacked.

The term concave, dish-shaped is used to describe the overall shape of each of the fan front and rear guard members 10 and 11, respectively. The term axial opening is used to denote the opening 19a in the fan rear guard member 11.

What is claimed is:

1. A hinged guard for an electric fan, comprising:
   (a) a concave, dish-shaped fan rear guard member having a vertical rear face with an axial opening;
   (b) said fan rear guard member having a plurality of mounting hole means disposed around said axial opening;
   (c) a concave, dish shaped fan front guard member;
   (d) retainer means for hingedly and releasably securing the fan front guard member to the fan rear guard member;
   (e) said retainer means including, a plurality of retainer eyelets, formed transverse to said axial opening, and peripherally spaced on each of the fan front and rear guard members, with each of the eyelets on the fan front member being adjacent to and aligned with an eyelet on the fan rear guard member to form pairs of said adjacent and aligned eyelets, and each of a plurality of peripherally disposed retainer rods is releasably mounted through at least one pair of said adjacent and aligned eyelets, and locking pins for locking the rods in the eyelets; and,
   (f) each of said retainer rods is curved and is mounted through two pairs of said adjacent and aligned eyelets, and when only one retainer rod is employed it hingedly connects the fan front guard member to the fan rear guard member and allows the fan front member to be moved from a closed position against the fan rear guard member to an open position for maintenance operations on the fan.

2. A hinged guard for an electric fan, as defined in claim 1, wherein:
   (a) said plurality of mounting hole means on the fan rear guard member are key hole shaped.

3. A hinged guard for an electric fan, as defined in claim 4, wherein:
   (a) the fan rear guard member includes a plurality of concentric, spaced apart, circular wires disposed about said axial opening, and the inner pair of said circular wires are bent in a plurality of circular positions, spaced 90 degrees apart, to form said plurality of key hole shaped mounting hole means.

4. A hinged guard for an electric fan, as defined in claim 2, wherein:
   (a) said plurality of mounting hole means on the fan rear guard member are each individually formed as a key hole shaped hole in a separate plate secured to the fan rear guard member, and said separate plates are circularly spaced 90 degrees apart.

5. A hinged guard for an electric fan, as defined in claim 2, wherein:
   (a) said plurality of mounting hole means on the fan rear guard member are formed as key hole shaped holes in a flat mounting ring secured to the fan rear guard member and in positions spaced 90 degrees apart.

* * * * *

UNITED STATES PATENT OFFICE
CERTIFICATE OF CORRECTION

Patent No. 5,002,462  Dated March 26, 1991

Inventor(s) Dwight C. Janisse

It is certified that error appears in the above-identified patent and that said Letters Patent is hereby corrected as shown below:

Column 6, claim 3, line 2, "claim 4" should be --claim 2--.

Signed and Sealed this

Twenty-first Day of July, 1992

Attest:

DOUGLAS B. COMER

*Attesting Officer*  *Acting Commissioner of Patents and Trademarks*